United States Patent [19]

Fry et al.

[11] Patent Number: 4,676,317

[45] Date of Patent: Jun. 30, 1987

[54] METHOD OF REDUCING FLUID LOSS IN CEMENT COMPOSITIONS WHICH MAY CONTAIN SUBSTANTIAL SALT CONCENTRATIONS

[75] Inventors: Slaton E. Fry; Jerry D. Childs, both of Duncan; Lance E. Brothers, Ninnekah; Donald W. Lindsey, Marlow, all of Okla.

[73] Assignee: Halliburton Company, Duncan, Okla.

[21] Appl. No.: 863,227

[22] Filed: May 13, 1986

[51] Int. Cl.$^4$ .................. C04B 24/00; E21B 33/14
[52] U.S. Cl. ......................... 166/293; 106/90; 523/130
[58] Field of Search .............. 166/293, 283; 106/90, 106/92, 93; 523/130

[56] References Cited

U.S. PATENT DOCUMENTS

| | | | |
|---|---|---|---|
| Re. 31,127 | 1/1983 | Childs et al. | 106/90 X |
| 2,646,360 | 7/1953 | Lea | 166/293 X |
| 2,674,321 | 4/1954 | Cutforth | 166/293 |
| 3,234,154 | 2/1966 | Martin | 106/93 X |
| 3,352,902 | 11/1967 | Moschopedis . | |
| 3,475,515 | 10/1969 | Blatz et al. | 523/130 X |
| 3,491,049 | 1/1970 | Gibson et al. | 166/293 X |
| 3,511,314 | 5/1970 | Scott, Jr. et al. | 166/293 |
| 3,959,004 | 5/1976 | Stryker | 106/93 |
| 4,015,991 | 4/1977 | Persinski et al. | 523/130 X |
| 4,181,533 | 1/1980 | Wilson | 106/90 X |
| 4,413,681 | 11/1983 | McKenzie | 166/293 |
| 4,501,672 | 2/1985 | Connell et al. . | |

*Primary Examiner*—George A. Suchfield
*Attorney, Agent, or Firm*—Robert A. Kent

[57] ABSTRACT

Cementing compositions having improved fluid loss capabilities for use in oil, gas, water and other well cementing operations are disclosed. Such compositions are comprised of water, hydraulic cement and a fluid-loss additive comprising a graft polymer comprised of a backbone of lignin, lignite, derivatized cellulose and various synthetic polymers selected from the group consisting of polyvinyl alcohol, polyethylene oxide, polypropylene oxide and polyethyleneimine. The grafted pendant groups comprise at least one member selected from the group of homopolymers, copolymers and terpolymers of 2-acrylamido-2-methylpropanesulfonic acid, acrylonitrile, N,N-dimethylacrylamide, acrylic acid, N,N-dialkylaminoethylmethacrylate and their salts. The backbone comprises from about 5 to about 95 percent by weight of the graft polymer, and the pendant groups can comprise from about 5 to about 95 percent by weight of the graft polymer.

19 Claims, No Drawings

METHOD OF REDUCING FLUID LOSS IN CEMENT COMPOSITIONS WHICH MAY CONTAIN SUBSTANTIAL SALT CONCENTRATIONS

FIELD OF THE INVENTION

The present invention relates to an aqueous cementing composition and method of using same in cementing oil and gas wells and the like. More particularly, the present invention concerns incorporation of a grafted polymer prepared by the polymerization of monomers or salts of monomers of N,N-dimethylacrylamide, 2-acrylamido-2-methylpropanesulfonic acid and acrylonitrile having a lignin or lignite or other backbone in a hydraulic cement which may contain substantial salt concentrations for the purpose of reducing fluid loss during cementing operations.

Certain polymer compositions have long been recognized by those skilled in the art of cementing wells in the petroleum industry as cementing additives useful in reducing fluid loss from a slurry of cement and water to the surrounding environment, such as, the formation. These compositions are commonly referred to as "fluid loss additives."

Discussions of the use of fluid-loss additives in well cementing compositions and their importance may be found in the following articles, the disclosures of which are incorporated herein by reference:

- A. Carter, Greg and Slagle, Knox, "A Study of Completion Practices to Minimize Gas Communication", Society of Petroleum Engineers Paper No. 3164, November 1970;
- B. Christian, W. W., Chatterji, Jiten, and Ostroot, Warren, "Gas Leakage in Primary Cementing—A Field Study and Laboratory Investigation", Society of Petroleum Engineers Paper No. 5517, October, 1975;
- C. Cook, C. and Cunningham, W., "Filtrate Control: A Key in Successful Cementing Practices", *Journal of Petroleum Technology*, August 1977, page 951;
- D. Smith, Dwight, *Cementing: SPE Monograph Volume* 4, published by Millet the Printer, Inc., Dallas, Tex., 1976.

An example of a fluid loss additive for use in an acidizing or fracturing composition is found in U.S. Pat. No. 4,107,057. In the '057 patent a copolymer of a sulfonic-acid modified acrylamide and a polyvinyl cross-linking agent is employed.

In the oil well cementing art, a variety of polymers have been disclosed as useful fluid loss additives for hydraulic oil well cements. For example, U.S. Pat. No. 4,015,991 discloses such a fluid loss additive for a hydraulic cement slurry consisting of hydrolyzed copolymers of acrylamide (AM) and 2-acrylamido-2-methylpropanesulfonic acid (AMPS ®). However, these AM/AMPS ® copolymers are useful only in operations where the bottom hole circulating temperature (BHCT) ranges from 90° to 125° F., whereas BHCT ranges encountered in such operations are often outside such a range. Still further, these copolymers have a salt tolerance of only up to about 10% by weight of water.

The temperature limitations of the AM/AMPS ® copolymers, that is, loss of usefulness above about 125° F. BHCT, are believed to be the result of hydrolysis of the amide groups. The carboxylate groups formed by such hydrolysis convert the copolymers to materials which function to retard the setting of the cement and to reduce the compressive strength of the set cement. Further, in the lower portion of the above-mentioned temperature range (between 90° and 100° F.) the AM/AMPS ® is less effective as a fluid loss additive, requiring inclusion of larger amounts of such additive than at higher temperatures. The inclusion of sufficiently large amount of additive to create an acceptable fluid loss composition often creates viscosity and pumpability problems, since the addition of such copolymer directly affects the resultant slurry rheology. Copolymers of acrylamide and AMPS ® exhibit high viscosity and poor mixability, resulting in cement slurries having poor pumpability characteristics during cementing operations. Mixability is a subjective term used to describe how well the components in the cement composition wet and mix with each other, as well as the energy required to create a generally homogeneous slurry.

Industry desires a fluid loss additive that has as little effect on compressive strength, set time, viscosity and thickening time as possible; is salt tolerable, that is, does not exhibit substantial loss of effectiveness in the presence of salt; and is chemically stable during cementing operations. Further, such desired fluid loss additive should be compatible with as many other additives and environmental conditions as possible, should be soluble in cement slurries at normal ambient temperatures encountered in oil well cementing operations, as well as continue to provide fluid-loss characteristics over a broad temperature range and at the high pH of the cementing compositions.

U.S. Pat. No. 4,515,635 discloses the use of copolymers of N,N-dimethylacrylamide (NNDMA) and AMPS ® having monomer ratios of NNDMA to AMPS ® of 1:4 to 4:1 and selected molecular weights as fluid loss additives for cement compositions. As illustrated in the patent, however, the copolymer fails to provide desired levels of fluid loss control even at relatively high concentrations to cements containing substantial salt concentrations.

It would be desirable to provide additives for use in reducing fluid loss in cement compositions, and particularly, those containing substantial salt concentrations where the bottom hole circulating temperatures may range from about 100° F. to in excess of about 400° F. without adversely affecting thickening time, compressive strength or other properties of the cement composition.

SUMMARY OF THE INVENTION

Cementing compositions having improved fluid loss capabilities for use in elevated temperature environments in oil, gas and water well cementing operations are disclosed. More particularly, such compositions are comprised of water, hydraulic cement and a fluid-loss additive comprising a graft polymer comprised of a backbone of lignin or lignite having pendant groups, preferably comprising at least one member selected from the group of homopolymers, copolymers and terpolymers of 2-acrylamido-2-methylpropanesulfonic acid, acrylonitrile and N,N-dimethylacrylamide and their salts. The backbone also can comprise a derivatized cellulose or various synthetic polymers selected from the group consisting of polyvinyl alcohol, polyethylene oxide, polypropylene oxide and polyethyleneimine. The pendant groups also can include acrylic acid, N,N-dialkylaminoethylmethacrylate and their salts. The alkyl groups in the N,N-dialkylaminoethylmethacrylate being selected from methyl, ethyl and propyl radicals.

The backbone compound comprises from about 5 to about 95 percent by weight of the graft polymer, and the pendant groups comprise from about 5 to about 95 percent by weight of the graft polymer.

In a preferred composition of the fluid-loss additive, the backbone comprises from about 20 to about 40 percent by weight of the graft polymer and the pendant groups comprise 2-acrylamido-2-methylpropanesulfonic acid, acrylonitrile and N,N-dimethylacrylamide in a mole ratio of from about 1:0:0 to about 3:3:1.

The polymers and salts of the polymers comprising the fluid-loss additive used in the present invention are relatively stable to hydrolysis over a wide range of temperature and pH. Such polymers and salts of the copolymers may be admixed in solid form with any dry hydraulic oil field cement or may be added at the time the cement slurry is being prepared, either to the mixing water or to the slurry. Additionally, methods of cementing a conduit in a borehole penetrating an earthen formation by introducing such a cementing composition into the space between such conduit and formation are disclosed.

So that the above-recited features, advantages and objects of the invention, as well as others which will become apparent, are attained and can be understood in detail, more particular description of the invention is set forth below with respect to typical embodiments thereof, but the described embodiments should not be considered limiting of its scope, for the invention may admit to other equally effective embodiments which will be apparent from the description to one of ordinary skill in the art.

DESCRIPTION OF THE PREFERRED EMBODIMENTS

New cementing compositions and methods of using same in oil, gas and water well cementing operations are disclosed. Such compositions are comprised of water, hydraulic cement, a graft polymer having a backbone comprising a lignin or lignite and pendant groups comprising homopolymers, copolymers or terpolymers of at least one member selected from the group consisting of 2-acrylamido-2-methylpropanesulfonic acid (hereinafter referred to as "AMPS ®", a registered trademark of The Lubrizol Corporation); acrylonitrile (hereinafter referred to as "ACN"); N,N-dimethylacrylamide (hereinafter referred to as "NNDMA"); acrylic acid (hereinafter referred to as "AA"); N,N-dimethylaminoethylmethacrylate (hereinafter referred to as "DMAEMA") and their salts. The backbone also can comprise derivatized cellulose, polyvinyl alcohol, polyethylene oxide, polypropylene oxide and polyethyleneimine.

The backbone of the graft polymer comprises from about 5 to about 95 percent by weight of the fluid-loss additive on a dry basis. Preferably, the backbone comprises from about 10 to about 50 and, most preferably, from about 20 to about 40 percent by weight of the fluid-loss additive on a dry basis. The pendant groups can comprise from about 5 to about 95 percent by weight of the fluid-loss additive on a dry basis. Preferably, the pendant groups comprise from about 50 to about 90 and, most preferably, from about 60 to about 80 percent by weight of the fluid-loss additive on a dry basis.

In a preferred composition of the fluid-loss additive, the pendant groups are selected from the group of AMPS ®, ACN and NNDMA polymers with the mole ratio of the AMPS ®:ACN polymers being in the range of from about 1:0 to about 1:1, and the AMPS ®:NNDMA being in the range of from about 1:0 to about 6:1. When salt is present in the aqueous fluid with which the cement is prepared or is present in the region to be contacted by the cement, the AMPS ® :ACN:NNDMA mole ratio preferably is in the range of from about 1:0:0 to about 3:3:1 and, most preferably, is in the range of from about 3:2:1 to about 3:3:1. Numerous salts of the graft polymers can be made. The preferred salts being made by neutralization of the acid form of the AMPS ® monomer or the copolymers with an alkaline agent such as a source of sodium, calcium, magnesium, ammonium ions or the like. Such alkaline agents can comprise, for example, sodium hydroxide, calcium hydroxide, ammonium hydroxide, magnesium hydroxide and the like.

The amount of each pendant group polymer present in the fluid loss additive will depend upon the amount of salt present, the temperature level to be experienced, rheological considerations, the average molecular weight of the polymers and other additives present.

The individual pendant groups comprising constituents of the fluid loss additives of the present invention generally are effective at reducing fluid loss in non-salt containing cementing compositions. The behavior of the various constituents of the additives, however, in salt-containing cementing compositions are very much different.

The pendant groups comprising constituents of the fluid-loss additives of the present invention are generally ineffective individually at reducing fluid loss even at high concentrations from salt-containing cementing compositions. However, they demonstrate a surprising ability in combination to substantially reduce fluid loss from the salt-containing cement compositions. Such reduction in fluid loss from the cement compositions is substantially in excess of any additive effect which the various compounds comprising the fluid loss additive may experience even when utilized at substantially greater individual concentration levels when admixed with cement and as such is totally unexpected.

The fluid-loss additives of the present invention containing pendant groups consisting of AMPS ®, ACN and NNDMA are effective in reducing fluid loss from cementing compositions containing in excess of about 10% salt by weight of water. The fluid loss additives are particularly effective at reducing fluid loss at elevated temperatures, that is, generally above 125° F. from cementing compositions containing in excess of 18% salt by weight of water up to the saturated salt concentration level.

The fluid-loss additive is admixed with the cement in an amount of from about 0.25 to about 5 percent by weight of the cement. Preferably, the fluid-loss additive is admixed with the cement in an amount of from about 0.5 to about 1.5 percent. When the aqueous fluid utilized to prepare the cement comprises substantially fresh water, the concentration preferably is in the range of from about 0.5 to about 1 percent by weight of cement. When salt is present, the fluid-loss additive preferably is present in an amount of from about 1.0 to about 1.5 percent by weight of cement. While it is to be understood that larger quantities of the fluid-loss additive can be utilized, such use is economically undesirable.

The cementing compositions of the present invention are useful in oil, gas and water well cementing operations since such compositions have reduced fluid loss to the surrounding formation. Such compositions are used to cement a conduit penetrating a permeable earthen formation via introducing such composition into the space between such conduit and such formation and allowing the composition to harden.

The graft polymers and graft polymer salts used in the present invention may be manufactured in accordance with various well know free-radical techniques. Such methods are described in, for example, the text entitled *Block and Graft Polymers* by William J. Burland and Allan S. Hoffman, copyright 1960 or *Graft Copolymers* by H. A. J. Battaerd and G. W. Tregear, copyright 1967, which are incorporated herein by reference. The initiators employed in the chain transfer reactions to produce the graft polymers of the present invention can comprise substantially any of the redox couples known to react with carbons bearing heteroatoms or with heteroatoms of nitrogen, oxygen or sulfur present in, for example, the lignite which can comprise the backbone. While various ceric salts and other compounds are useful to effect the free radical initiation required to produce the compounds of the present invention, a potassium persulfate-potassium bisulfite redox system has been employed in the preparation of the various lignite graft polymers. The initiator for the polymeric backbones comprised a ferrous salt with hydrogen peroxide. The particular solvent employed in the polymerization reactions was water. However, as is well known by those skilled in the art, any other solvent which will solubilize the reactants to a reasonable extent also may be utilized. While not required to effect graft formation, removal of any free oxygen in the solvent is desirable to improve product yields. Free oxygen can be removed, for example, by bubbling nitrogen gas through the solution of reactants for a period of about one hour or more by which time the nitrogen will effectively displace any dissolved oxygen gas in the solution. The reaction can be effected over a wide temperature range with increased temperature generally accelerating the rate of the reaction. The temperature of the reaction can be in the range, for example, of from about 40° C. to the temperature at which solvent reflux is achieved. Satisfactory reactions with lignite backbones were found to occur at a temperature of about 60° C.

The lignite which may comprise brown coal, oxidized lignite such as leonardite or any other low rank coal resulting from the alteration of vegetal material is prepared for reaction with the various polymers by treatment with caustic or the like. The treatment is effected by contacting the lignite with caustic alkali or aqueous ammonia solutions which dissolves or disperses a portion of the lignite into the solution. The solution then may be separated from the remaining solids by filtration or the like. The solution can be concentrated to increase the lignite content or utilized directly in the graft polymerization reaction.

While the exact nature of the graft polymerization of the lignite and lignin is unknown, it is believed that the various monomers react at the heteroatom and hydroxyl sites present on the backbone compound to form graft polymers containing various members of the monomers in a random nature. Surprisingly, it has been found that the best results are obtained when the AMPS®, ACN and NNDMA monomers are all admixed with the backbone compound prior to initiation of the polymerization reaction when it is desired to produce a fluid-loss additive that exhibits significant salt tolerance in the cement composition.

The salts of the various graft polymers may be produced in accordance with the various well known techniques. The salt may be formed, for example, by reaction of an alkaline agent with either the AMPS® monomer or other polymer before polymerization or after. The salt may be formed with any alkaline agent which does not adversely react with the monomers of the polymer or the other constituents present in the cementing composition.

The term "lignite" as used herein in reference to the graft polymer means the aqueous soluble or dispersible products resulting from the treatment of a source of lignite material with caustic or aqueous ammonium solutions.

The term "lignin" as used herein in reference to the graft polymer means the aqueous soluble or dispersible products or derivatives resulting from the treatment of a source of lignin material with caustic, sulfites or sulfates, or by alkaline oxidation, such as lignosulfonate and the like produced by the well known processes for production of paper pulp.

The term "cement" as used herein is intended to include those compounds of a cementitious nature which are described as hydraulic cements. Such compounds include, for example, Portland Cement in general and particularly Portland Cements of API Classes G and H, although other API classes can be utilized, pozzolan cements, gypsum cements, high alumina content cements, high gel (high clay content) cements, silicate containing cements and high alkalinity cements can be used in various applications of the present invention. Portland cements and particularly cements of API Classes G and H are preferred.

The aqueous fluid utilized in the cement composition can be water from any source provided that it does not contain an excess of any compounds that affect the stability of the cement composition of the present invention. The aqueous fluid can contain various salts such as sodium chloride, potassium chloride, calcium chloride and the like.

Other types of well known and conventional additives also can be incorporated into the cement composition to modify the properties of the composition. Such additives include additional fluid loss additives or viscosifiers, retarders, accelerators, dispersants, weight-adjusting materials or fillers and the like.

Additional fluid-loss additives which may be incorporated into the cement composition of the present invention include cellulose derivatives such as carboxymethylhydroxyethyl cellulose, hydroxyethyl cellulose, modified polysaccharides, polyacrylamides polyaromatic sulfonates, guar gum derivatives, mixtures of such compounds and the like. Numerous other compounds which may be utilized as additional fluid loss additives are well known by those skilled in cementing technology.

A retarder may be used in the cementing composition when the bottom hole circulating temperature exceeds 100° F. Retarders satisfactory for use in the present invention include those commercially available products commonly utilized as retarders. Examples of retarders which can be used to carry out the invention include lignosulfonates, such as calcium lignosulfonate and sodium lignosulfonate, organic acids such as tartaric acid and gluconic acid and mixtures thereof. The amount of retarder required will vary according to the bottom hole circulating temperatures and variations in the makeup of the cement itself. The proper amount of retarder required in any particular case should be determined by running a "thickening time" test for the particular concentration of retarder and cement composition being used. Such tests should be run according to the precedures set by API SPEC 10. Generally speaking, "thickening time" is defined in API SPEC 10 as the elapsed time from the time pumping begins until the cement reaches from about 70 to 100 units of consistency. In most applications the amount of retarder, if any, required will not exceed more than about 5.0 percent by weight of the cement composition.

Dispersing agents can be utilized to facilitate using lower quantities of water and to promote higher set cement strength. Friction reducers which promote freer movement of the unset composition, and allow ease of pumping through the annulus, if present, can be incorporated in the slurry in amounts up to about several percent by weight of dry cement. Some dual function additives, such as lignosulfonates which function both as a dispersant and also as a set time retarder, can be incorporated in the slurry where their use would be advantageous for certain cementing situations.

Accelerators, such as the soluble inorganic salts in addition to calcium chloride, can be utilized up to about 8 percent by weight of cement.

The cement composition also may include, in particular applications, foaming agents or defoaming agents which comprise various anionic cationic, nonionic and other surface active compounds. The amount of such surface active agents added to the cement composition will typically be in the range of from about 0.1 to about 3 percent by weight of cement. Generally, the selection of such additives will be within the skill of those knowledgeable in cement technology.

Of the various types of fine aggregate or particulate filler materials which can be used, fly ash, silica flour, fine sand, diatomacious earth, lightweight aggregate and hollow spheres can be cited as typical. The use of these materials is well understood in the art, and so long as they are compatible with the compositions of the invention, they can be employed over wide ranges of concentration.

To illustrate the unique benefits of the method of the present invention and not by way of limitation, the following examples are presented.

EXAMPLE I

A number of materials were tested as potential fluid-loss additives for cements, including various graft polymers of the present invention. These tests were performed at 125° F. using cement slurries comprising Class H cement, 0.25% defoamer comprising tri-n-butylphosphate by weight of cement, 1.0% fluid-loss additive by weight of cement, and 46% water by weight of dry cement. The various additives identified in the following table were mixed into the cement slurries in an atmospheric consistometer which was preheated to test temperature and stirred for twenty minutes. The atmospheric consistometer is a nonpressurized device that simulates a cementing pumping process via movement of the consistometer can about a paddle. Temperature can be varied, but pressure is atmospheric. Fluid loss then is measured at 1000 psi through a 325 mesh screen on the U.S. Sieve Series in cc/30 minutes. The foregoing test procedure is more fully outlined in API Spec 10, Second Edition, June 15, 1984, entitled *API Specification for Materials and Testing for Well Cements* which is incorporated herein by reference. The results of these fluid-loss tests are provided in Table I. The Table I test results indicate that certain admixtures of polymers are effective fluid-loss additives under static conditions at 125° F. In general, if a material is ineffective at a low temperature, it is even less effective at more elevated temperatures.

TABLE I

| Sample Fluid-Loss Additive | Consistometer Reading 0 min | Consistometer Reading 20 min | Fluid-Loss in cc/30 min. 1000 psi and 325 mesh screen |
|---|---|---|---|
| Poly(methylhydrosiloxane)-g-monomethyl-poly(ethylene glycol) | 2 | 5 | 1600 |
| Hydroxyethylcellulose-g-AMPS ® | 26 | 7 | 450 |
| Poly(allylamine-HCl)-g-AMPS ® | 5 | 8 | 2600 |
| Poly(vinyl alcohol)-g-AMPS ®/DMAEMA | 5 | 8 | 32 |
| Poly(tetraethylenepentamine)-g-AMPS ® | 3 | 5 | 2600 |
| Poly(ethylene glycol)-g-AMPS ® 0.26:1 | 2 | 6 | 48 |
| Carboxymethylcellulose-g-AMPS ® | 3 | 11 | 84 | g: Graft
AMPS: 2-acrylamido-2-methylpropanesulfonic acid
DMAEMA: N,N—dimethylaminoethylmethacrylate

EXAMPLE II

The test procedure of Example I is repeated for the testing of certain materials comprising ungrafted lignites and lignites grafted with AMPS ®, ACN or DMA as potential fluid-loss additives for cements which can contain substantial salt concentrations. These tests are performed at 125° F. using cement slurries comprising Class H cement, 38% water by weight of cement and 1% fluid-loss additive sample by weight of cement.

The Table II results indicate that certain admixtures of pendant polymers are effective fluid-loss additives under static conditions in fresh water and salt-containing cements.

TABLE II

| Sample No. | Sample Fluid-Loss Additive Lignite, Wt. % | Mole Ratio AMPS ® | Mole Ratio ACN | Mole Ratio DMA | Salt, % By Wt. of Water | Consistometer Reading 0 min | Consistometer Reading 20 min | Fluid-Loss in cc/30 min. 1000 psi and 325 mesh screen |
|---|---|---|---|---|---|---|---|---|
| 1. | 33.3 | 3.6 | 2.65 | 1.0 | 0 | 4 | 5 | 28 |
| 2. | 33.3 | 3.6 | 2.65 | 1.0 | 18 | 4 | 5 | 40 |
| 3. | 33.3 | 3.6 | 2.65 | 1.0 | 37.2 | 4 | 5 | 248 |
| 4. | 33.3 | 3.6 | 2.65 | 1.0 | sea water | 4 | 6 | 76 |
| 5. | 33.3 | 2.5 | 1.3 | 1.0 | 0 | 3 | 4 | 28 |
| 6. | 33.3 | 2.5 | 1.3 | 1.0 | 18 | 3 | 5 | 48 |
| 7. | 33.3 | 2.5 | 1.3 | 1.0 | 37.2 | 4 | 5 | 199 |

TABLE II-continued

| Sample No. | Sample Fluid-Loss Additive Lignite, Wt. % | Mole Ratio | | | Salt, % By Wt. of Water | Consistometer Reading | | Fluid-Loss in cc/30 min. 1000 psi and 325 mesh screen |
|---|---|---|---|---|---|---|---|---|
| | | AMPS ® | ACN | DMA | | 0 min | 20 min | |
| 8. | 33.3 | 2.5 | 1.3 | 1.0 | sea water | 4 | 6 | 38 |
| 9. | 20 | 3.1 | 1.0 | 1.3 | 0 | 4 | 5 | 26 |
| 10. | 20 | 3.1 | 1.0 | 1.3 | 18 | 5 | 5 | 80 |
| 11. | 20 | 3.1 | 1.0 | 1.3 | 37.2 | 4 | 5 | 173 |
| 12. | 20 | 3.1 | 1.0 | 1.3 | sea water | 5 | 5 | 40 |
| 13. | 20 | 1.7 | — | 1.0 | 0 | 5 | 5 | 24 |
| 14. | 20 | 1.7 | — | 1.0 | 18 | 4 | 5 | 145 |
| 15. | 20 | 1.7 | — | 1.0 | 37.2 | 4 | 4 | 199 |
| 16. | 20 | 1.7 | — | 1.0 | sea water | 5 | 6 | 34 |
| 17. | 50 | 1.0 | — | — | 0 | 3 | 6 | 64 |
| 18. | 50 | 1.0 | — | — | 18 | 3 | 8 | 356 |
| 19. | 50 | 1.0 | — | — | 37.2 | 3 | 8 | 655 |
| 20. | 50 | 1.0 | — | — | sea water | 3 | 8 | 185 |
| 21. | 33.3 | 3.8 | — | 1.0 | 0 | 3 | 3 | 60 |
| 22. | 33.3 | 3.8 | — | 1.0 | 18 | 3 | 6 | 403 |
| 23. | 33.3 | 3.8 | — | 1.0 | 37.2 | 3 | 5 | 473 |
| 24. | 33.3 | 3.8 | — | 1.0 | sea water | 3 | 5 | 151 |
| 25. | 33.3 | 2.1 | — | 1.0 | 0 | 3 | 3 | 46 |
| 26. | 33.3 | 2.1 | — | 1.0 | 18 | 3 | 5 | 368 |
| 27. | 33.3 | 2.1 | — | 1.0 | 37.2 | 3 | 5 | 433 |
| 28. | 33.3 | 2.1 | — | 1.0 | sea water | 3 | 6 | 70 |
| 29. | 5.0 | 2.55 | 1.3 | 1.0 | 0 | 18 | 18 | 20 |
| 30. | 5.0 | 2.55 | 1.3 | 1.0 | 18 | 12 | 12 | 60 |
| 31. | 5.0 | 2.55 | 1.3 | 1.0 | 37.2 | 10 | 12 | 105 |
| 32. | 5.0 | 2.55 | 1.3 | 1.0 | sea water | 37 | 25 | 38 |
| 33. | 33.3 | 1.2 | 0.11 | 1.0 | 0 | 4 | 5 | 24 |
| 34. | 33.3 | 1.2 | 0.11 | 1.0 | 18 | 3 | 4 | 34 |
| 35. | 33.3 | 1.2 | 0.11 | 1.0 | 37.2 | 5 | 5 | 121 |
| 36. | 33.3 | 1.2 | 0.11 | 1.0 | sea water | 5 | 6 | 34 |
| 37. | 33.3 | 3.3 | 1.3 | 1.0 | 0 | 4 | 5 | 32 |
| 38. | 33.3 | 3.3 | 1.3 | 1.0 | 18 | 3 | 5 | 51 |
| 39. | 33.3 | 3.3 | 1.3 | 1.0 | 37.2 | 4 | 7 | 452 |
| 40. | 33.3 | 3.3 | 1.3 | 1.0 | sea water | 4 | 8 | 132 |
| 41. | 33.3 | 3.9 | 1.3 | 1.0 | 0 | 4 | 5 | 28 |
| 42. | 33.3 | 3.9 | 1.3 | 1.0 | 18 | 3 | 4 | 60 |
| 43. | 33.3 | 3.9 | 1.3 | 1.0 | 37.2 | 4 | 6 | 440 |
| 44. | 33.3 | 3.9 | 1.3 | 1.0 | sea water | 4 | 8 | 152 |
| 45. | 33.3 | 4.4 | 1.0 | 1.0 | 0 | 4 | 5 | 28 |
| 46. | 33.3 | 4.4 | 1.0 | 1.0 | 18 | 3 | 4 | 60 |
| 47. | 33.3 | 4.4 | 1.0 | 1.0 | 37.2 | 4 | 8 | 416 |
| 48. | 33.3 | 4.4 | 1.0 | 1.0 | sea water | 5 | 8 | 69 |
| 49. | 33.3 | 5.5 | 1.0 | 1.0 | 0 | 5 | 6 | 30 |
| 50. | 33.3 | 5.5 | 1.0 | 1.0 | 18 | 3 | 5 | 84 |
| 51. | 33.3 | 5.5 | 1.0 | 1.0 | 37.2 | 3 | 8 | 494 |
| 52. | 33.3 | 5.5 | 1.0 | 1.0 | sea water | 5 | 9 | 104 |
| 53. | 33.3 | 3.9 | 1.0 | — | 0 | 5 | 5 | 64 |
| 54. | 33.3 | 3.9 | 1.0 | — | 18 | 3 | 5 | 211 |
| 55. | 33.3 | 3.9 | 1.0 | — | 37.2 | 3 | 9 | 655 |
| 56. | 33.3 | 3.9 | 1.0 | — | sea water | 4 | 8 | 201 |
| 57. | 33.2 | 1.9 | 1.0 | — | 0 | 5 | 6 | 56 |
| 58. | 33.2 | 1.9 | 1.0 | — | 18 | 4 | 6 | 200 |
| 59. | 33.2 | 1.9 | 1.0 | — | 37.2 | 4 | 10 | 582 |
| 60. | 33.2 | 1.9 | 1.0 | — | sea water | 4 | 7 | 282 |
| 61. | 100 | — | — | — | 0 | 2 | 6 | 940 |
| 62. | 100 | — | — | — | 18 | 3 | 8 | 1100 |
| 63. | 100 | — | — | — | 37.2 | 3 | 3 | 1700 |
| 64. | 100 | — | — | — | sea water | 5 | 5 | 870 |

EXAMPLE III

The test procedure of Example I is repeated for the compounds of Example II at 190° F. using cement slurries comprising Class H cement, 35% particulate silica by weight of cement, 0.5% retarder by weight of cement, 38% water by weight of cement and 1.0% potential fluid-loss additive by weight of cement.

The results of the tests are set forth in Table III.

TABLE III

| Sample No. | Sample Fluid-Loss Additive Lignite, Wt. % | Mole Ratio AMPS® | Mole Ratio ACN | Mole Ratio DMA | Salt, % By Wt. of Water | Consistometer Reading 0 min | Consistometer Reading 20 min | Fluid-Loss in cc/30 min. 1000 psi and 325 mesh screen |
|---|---|---|---|---|---|---|---|---|
| 1. | 33.3 | 3.6 | 2.65 | 1.0 | 0 | 4 | 10 | 73 |
| 2. | 33.3 | 3.6 | 2.65 | 1.0 | 18 | 6 | 11 | 107 |
| 3. | 33.3 | 3.6 | 2.65 | 1.0 | 37.2 | 7 | 6 | 50 |
| 4. | 33.3 | 3.6 | 2.65 | 1.0 | sea water | 6 | 12 | 77 |
| 5. | 33.3 | 2.5 | 1.3 | 1.0 | 0 | 5 | 8 | 82 |
| 6. | 33.3 | 2.5 | 1.3 | 1.0 | 18 | 9 | 10 | 128 |
| 7. | 33.3 | 2.5 | 1.3 | 1.0 | 37.2 | 7 | 5 | 40 |
| 8. | 33.3 | 2.5 | 1.3 | 1.0 | sea water | 6 | 7 | 160 |
| 9. | 20 | 3.1 | 1.0 | 1.3 | 0 | 5 | 9 | 78 |
| 10. | 20 | 3.1 | 1.0 | 1.3 | 18 | 7 | 7 | 117 |
| 11. | 20 | 3.1 | 1.0 | 1.3 | 37.2 | 8 | 5 | 30 |
| 12. | 20 | 3.1 | 1.0 | 1.3 | sea water | 7 | 11 | 138 |
| 13. | 20 | 1.7 | — | 1.0 | 0 | 5 | 10 | 112 |
| 14. | 20 | 1.7 | — | 1.0 | 18 | 7 | 8 | 99 |
| 15. | 20 | 1.7 | — | 1.0 | 37.2 | 7 | 6 | 46 |
| 16. | 20 | 1.7 | — | 1.0 | sea water | 6 | 11 | 135 |
| 17. | 50 | 1.0 | — | — | 0 | 5 | 8 | 77 |
| 18. | 50 | 1.0 | — | — | 18 | 7 | 15 | 270 |
| 19. | 50 | 1.0 | — | — | 37.2 | 8 | 8 | 52 |
| 20. | 50 | 1.0 | — | — | sea water | 5 | 10 | 110 |
| 21. | 33.3 | 3.8 | — | 1.0 | 0 | 4 | 8 | 110 |
| 22. | 33.3 | 3.8 | — | 1.0 | 18 | 7 | 9 | 240 |
| 23. | 33.3 | 3.8 | — | 1.0 | 37.2 | 7 | 8 | 104 |
| 24. | 33.3 | 3.8 | — | 1.0 | sea water | 5 | 8 | 100 |
| 25. | 33.3 | 2.1 | — | 1.0 | 0 | 5 | 8 | 78 |
| 26. | 33.3 | 2.1 | — | 1.0 | 18 | 6 | 8 | 300 |
| 27. | 33.3 | 2.1 | — | 1.0 | 37.2 | 6 | 6 | 108 |
| 28. | 33.3 | 2.1 | — | 1.0 | sea water | 5 | 9 | 89 |
| 29. | 5.0 | 2.55 | 1.3 | 1.0 | 0 | 17 | 13 | 22 |
| 30. | 5.0 | 2.55 | 1.3 | 1.0 | 18 | 15 | 10 | 24 |
| 31. | 5.0 | 2.55 | 1.3 | 1.0 | 37.2 | 16 | 10 | 14 |
| 32. | 5.0 | 2.55 | 1.3 | 1.0 | sea water | 23 | 21 | 28 |
| 33. | 33.3 | 1.2 | 0.11 | 1.0 | 0 | 6 | 16 | 46 |
| 34. | 33.3 | 1.2 | 0.11 | 1.0 | 18 | 5 | 14 | 62 |
| 35. | 33.3 | 1.2 | 0.11 | 1.0 | 37.2 | 7 | 6 | 28 |
| 36. | 33.3 | 1.2 | 0.11 | 1.0 | sea water | 7 | 20 | 50 |
| 37. | 33.3 | 3.3 | 1.3 | 1.0 | 0 | 6 | 14 | 70 |
| 38. | 33.3 | 3.3 | 1.3 | 1.0 | 18 | 6 | 11 | 64 |
| 39. | 33.3 | 3.3 | 1.3 | 1.0 | 37.2 | 5 | 7 | 46 |
| 40. | 33.3 | 3.3 | 1.3 | 1.0 | sea water | 4 | 16 | 110 |
| 41. | 33.3 | 3.9 | 1.3 | 1.0 | 0 | 6 | 12 | 51 |
| 42. | 33.3 | 3.9 | 1.3 | 1.0 | 18 | 5 | 11 | 72 |
| 43. | 33.3 | 3.9 | 1.3 | 1.0 | 37.2 | 5 | 8 | 42 |
| 44. | 33.3 | 3.9 | 1.3 | 1.0 | sea water | 6 | 18 | 99 |
| 45. | 33.3 | 4.4 | 1.0 | 1.0 | 0 | 5 | 17 | 59 |
| 46. | 33.3 | 4.4 | 1.0 | 1.0 | 18 | 6 | 7 | 42 |
| 47. | 33.3 | 4.4 | 1.0 | 1.0 | 37.2 | 8 | 4 | 20 |
| 48. | 33.3 | 4.4 | 1.0 | 1.0 | sea water | 7 | 19 | 79 |
| 49. | 33.3 | 5.5 | 1.0 | 1.0 | 0 | 6 | 20 | 59 |
| 50. | 33.3 | 5.5 | 1.0 | 1.0 | 18 | 7 | 7 | 50 |
| 51. | 33.3 | 5.5 | 1.0 | 1.0 | 37.2 | 6 | 5 | 20 |
| 52. | 33.3 | 5.5 | 1.0 | 1.0 | sea water | 6 | 17 | 96 |
| 53. | 33.3 | 3.9 | 1.0 | — | 0 | 6 | 16 | 58 |
| 54. | 33.3 | 3.9 | 1.0 | — | 18 | 6 | 8 | 54 |
| 55. | 33.3 | 3.9 | 1.0 | — | 37.2 | 5 | 5 | 30 |
| 56. | 33.3 | 3.9 | 1.0 | — | sea water | 6 | 15 | 160 |
| 57. | 33.2 | 1.9 | 1.0 | — | 0 | 6 | 16 | 64 |
| 58. | 33.2 | 1.9 | 1.0 | — | 18 | 6 | 7 | 50 |
| 59. | 33.2 | 1.9 | 1.0 | — | 37.2 | 5 | 5 | 30 |
| 60. | 33.2 | 1.9 | 1.0 | — | sea | 6 | 16 | 148 |

TABLE III-continued

| Sample No. | Sample Fluid-Loss Additive Lignite, Wt. % | Mole Ratio AMPS ® | Mole Ratio ACN | Mole Ratio DMA | Salt, % By Wt. of Water | Consistometer Reading 0 min | Consistometer Reading 20 min | Fluid-Loss in cc/30 min. 1000 psi and 325 mesh screen |
|---|---|---|---|---|---|---|---|---|
| 61. | 100 | — | — | — | 0 | 7 | 7 | 820 |
| 62. | 100 | — | — | — | 18 | 4 | 7 | 1400 |
| 63. | 100 | — | — | — | 37.2 | 3 | 5 | 1600 |
| 64. | 100 | — | — | — | sea water | 4 | 4 | 1400 |
| 65.[1] | 0 | 2.5 | 1.3 | 1.0 | 0 | — | — | 350 |
| 66.[1] | 0 | 2.5 | 1.3 | 1.0 | 37.2 | — | — | 1150 |
| 67.[1] | 0 | 2.5 | 1.3 | 1.0 | sea water | — | — | 740 |
| 68.[2] | 33.3 | 2.5 | 1.3 | 1.0 | 0 | — | — | 520 |
| 69.[2] | 33.3 | 2.5 | 1.3 | 1.0 | 37.2 | — | — | 1130 |
| 70.[2] | 33.3 | 2.5 | 1.3 | 1.0 | sea water | — | — | 710 |

[1]Polymerized monomers only, no lignite
[2]Physical mixture only - no graft polymerization The results of Tables II and III clearly indicate the advantages of grafting polymer sidechains onto various backbones. The use of lignite as a backbone in the fluid-loss additive is particularly advantageous since fluid-loss control is achieved over a broad range of ionic strengths in the fluids and satisfactory cement slurries can be prepared from sea water which facilitates offshore cementing operations.

EXAMPLE IV

Density segregation and free water studies were conducted on a portion of the cement slurries of Example III to determine the amount of free water formed and particle settling after a period of standing for two hours. The slurry sample is mixed on the consistometer for 20 minutes and poured directly into a 250 cc graduated cylinder. Percent free water and settling of the slurry was measured after two hours. The sample number corresponds to the sample number for the additive tested in Example III.

TABLE IV

| Sample No. | Free Water % | Settling[1] % |
|---|---|---|
| 1. | Trace | 0 |
| 2. | Trace | 0 |
| 3. | Trace | 0 |
| 4. | Trace | 0 |
| 5. | Trace | 3.2 |
| 6. | 1.2 | 0 |
| 7. | 0.4 | 3.2 |
| 8. | Trace | 0 |
| 9. | 0.8 | 0 |
| 10. | 4.8 | 0 |
| 11. | 4.8 | 0 |
| 12. | Trace | 0 |
| 13. | 0.2 | 1.6 |
| 14. | 0.4 | 0 |
| 15. | 4.8 | 0 |
| 16. | Trace | 0 |
| 17. | 0.4 | 52 |
| 18. | 1.6 | 0 |
| 19. | 0.4 | 12 |
| 20. | 0.4 | 0 |
| 21. | 0.8 | 44 |
| 22. | 1.6 | 0 |
| 23. | 0.4 | 0 |
| 24. | 0.8 | 4 |
| 25. | 0.4 | 60 |
| 26. | 4.0 | 4 |
| 27. | Trace | 0 |
| 28. | 1.6 | 4 |
| 29. | 0 | 0 |
| 30. | 0 | 0 |
| 31. | 0 | 0 |
| 32. | 0 | 0 |
| 33. | 1.6 | 36 |
| 34. | 2.4 | 36 |
| 35. | 4.0 | 44 |
| 36. | 0.8 | 0 |
| 37. | 1.6 | 40 |
| 38. | 0.8 | 0 |
| 39. | Trace | 0 |
| 40. | 0 | 0 |
| 41. | 2.4 | 39 |
| 42. | 1.6 | 24 |
| 43. | 0.4 | 0 |
| 44. | Trace | 0 |
| 45. | 3.2 | 42 |
| 46. | 2.0 | 20 |
| 47. | Trace | 0 |
| 48. | 0 | 0 |
| 49. | 2.4 | 40 |
| 50. | 0.8 | 0 |
| 51. | Trace | 0 |
| 52. | Trace | 0 |
| 53. | Trace | 0 |
| 54. | 1 | 0 |
| 55. | 0.5 | 0 |
| 56. | 0.5 | 0 |
| 57. | 4.0 | 36 |
| 58. | 0.8 | 0.8 |
| 59. | 0.4 | 0 |
| 60. | Trace | 0 |

[1]Solids on the bottom of the graduated cylinder unpenetrable by a metal ruler

In oil well cementing operations, it is important that free water values as defined in API Spec 10, Second Edition, June 15, 1984, previously identified, the disclosure of which is incorporated herein by reference, be maintained at low values. The importance of this parameter is discussed in a paper by Wester, W. W. and Eikerts, J. V. entitled "Flow After Cementing: A Field and Laboratory Study", Society of Petroleum Engineers Paper No. 8259, September 1979, the disclosure of which is incorporated by reference. Although API free water values give an indication of particle settling or sedimentation in a cementing slurry, it is possible for certain cementing compositions to have low API free water values and still involve settling. For a vertical, uniform sheath of set cement to be formed in a well bore, particle sedimentation should be minimized in the design of the cementing compositions. As indicated by the data in Table IV, it is possible to design cementing compositions which readily meet the desired low API free water values and minimize particle sedimentation using the additives of the present invention. For those fluid-loss additives identified in Table IV which provide unacceptable API free water values or settling, it is possible in some instances to effect certain cementing composition formulation modifications as is known in the art to combat these problems. These modifications can be accomplished while maintaining the highly desirable fluid-loss response properties of the graft polymer comprising the fluid-loss additive of the present invention.

While that which is considered to be the preferred embodiment of the invention has been described hereinbefore, it is to be understood that modifications and changes can be made in the method of the present invention without departing from the spirit or scope of the invention as set forth in the following claims.

What is claimed is:

1. A method of cementing a conduit in a borehole penetrating an earthen formation by introducing a cementing composition into the space between said conduit and said formation, said cementing composition comprising:
   cement;
   an aqueous fluid, and
   a fluid-loss additive comprising a graft polymer comprising a backbone comprising at least one member selected from the group consisting of lignin, lignite and their salts and a grafted pendant group comprising at least one member selected from the group consisting of 2-acrylamido-2-methylpropanesulfonic acid, acrylonitrile, N,N-dimethylacrylamide, acrylic acid, N,N-dialkylaminoethylmethacrylate wherein said alkyl radical comprises at least one member selected from the group consisting of methyl, ethyl and propyl radicals.

2. The method of claim 1 wherein said backbone of said fluid-loss additive comprises from about 5 to about 95 percent by weight of said fluid-loss additive.

3. The method of claim 1 wherein said pendant groups of said fluid-loss additive comprise from about 50 to about 90 percent by weight of said fluid-loss additive.

4. The method of claim 1 wherein said pendant groups of said fluid-loss additive comprise from about 60 to about 80 percent by weight of said fluid-loss additive.

5. The method of claim 1 wherein said aqueous fluid contains salt.

6. The method of claim 1 wherein said fluid-loss additive is present in said cementing composition in an amount of from about 0.25 percent to about 5 percent by weight of the cement.

7. The method of claim 1 wherein said fluid-loss additive is present in said cementing composition in an amount of from about 0.5 percent to about 1.5 percent by weight of the cement.

8. The method of claim 1 wherein the pendant groups of said fluid-loss additive comprise at least one member selected from the group consisting of 2-acrylamido-2-methylpropanesulfonic acid, acrylonitrile, N,N-dimethylacrylamide and their salts.

9. The method of claim 1 wherein said pendant groups comprise 2-acrylamido-2-methylpropanesulfonic acid, acrylonitrile and N,N-dimethylacrylamide or their salts and are present in said graft polymer in a molar ratio in the range of from about 1:0:0 to about 3:3:1, respectively.

10. The method of claim 1 wherein said pendant groups comprise 2-acrylamido-2-methylpropanesulfonic acid, acrylonitrile and N,N-dimethylacrylamide or their salts and are present in said graft polymer in a molar ratio in the range of from about 3:2:1 to about 3:3:1, respectively.

11. The method of claim 1 wherein the pendant groups comprise 2-acrylamido-2-methylpropanesulfonic acid and acrylonitrile or their salts and are present in said graft polymer in a molar ratio in the range of from about 1:0 to about 1:1, respectively.

12. The method of claim 1 wherein the pendant groups comprise 2-acrylamido-2-methylpropanesulfonic acid and N,N-dimethylacrylamide or their salts and are present in said graft polymer in a molar ratio in the range of from about 1:0 to about 6:1, respectively.

13. A method of cementing a conduit penetrating a permeable earthen formation comprising:
   introducing a cementing composition into the space between said conduit and said formation, said cementing composition comprising:
   cement,
   an aqueous fluid, and
   a fluid-loss additive comprising a graft polymer comprising a backbone comprising at least one member selected from the group consisting of lignin, lignite, and their salts and a grafted pendant group comprising at least one member selected from the group consisting of 2-acrylamido-2-methylpropanesulfonic acid, acrylonitrile, N,N-dimethylacrylamide and their salts; and
   allowing said cementing composition to set within said space.

14. The method of claim 13 wherein said aqueous fluid contains salt.

15. The method of claim 13 wherein the pendant groups comprise 2-acrylamido-2-methylpropanesulfonic acid and acrylonitrile or their salts and are present in said graft polymer in a molar ratio in the range of from about 1:0 to about 1:1, respectively.

16. The method of claim 13 wherein the pendant groups comprise 2-acrylamido-2-methylpropanesulfonic acid and N,N dimethylacrylamide or their salts and are present in said graft polymer in a molar ratio in the range of from about 1:0 to about 6:1, respectively.

17. The method of claim 13 wherein said pendant groups comprise 2-acrylamido-2-methylpropanesulfonic acid, acrylonitrile and N,N-dimethylacrylamide or their salts and are present in said graft polymer in a molar ratio in the range of from about 1:0:0 to about 3:3:1, respectively.

18. A method of cementing a conduit penetrating a permeable earthen formation comprising introducing a cementing composition into the space between said conduit and said formation, said cementing composition comprising:
   cement,
   an aqueous fluid containing salt,
   a fluid-loss additive comprising a graft polymer comprising a backbone comprising at least one member selected from the group consisting of lignin, lignite and their salts and a grafted pendant group comprising at least one member selected from the group consisting of 2-acrylamido-2-methylpropanesulfonic acid, acrylonitrile, N,N-dimethylacrylamide and their salts; and allowing said cementing composition to set within said space.

19. The method of claim 18 wherein said pendant groups comprise 2-acrylamido-2-methylpropanesulfonic acid, acrylonitrile and N,N-dimethylacrylamide or their salts and are present in said graft polymer in a molar ratio in the range of from about 3:2:1 to about 3:3:1, respectively.

* * * * *